United States Patent
Chen et al.

(10) Patent No.: US 12,250,621 B2
(45) Date of Patent: Mar. 11, 2025

(54) METHOD FOR IMPROVED ROAMING OF A LIMITED-BANDWIDTH USER EQUIPMENT

(71) Applicant: Telit Cinterion Deutschland GmbH, Munich (DE)

(72) Inventors: Dong Chen, La Ciotat (FR); Volker Breuer, Boetzow (DE); Xu Zhu, La Ciotat (FR)

(73) Assignee: Telit Cinterion Deutschland GmbH, Munich (DE)

( * ) Notice: Subject to any disclaimer, the term of this patent is extended or adjusted under 35 U.S.C. 154(b) by 688 days.

(21) Appl. No.: 17/612,633

(22) PCT Filed: Apr. 17, 2020

(86) PCT No.: PCT/EP2020/060872
§ 371 (c)(1),
(2) Date: Nov. 19, 2021

(87) PCT Pub. No.: WO2020/239324
PCT Pub. Date: Dec. 3, 2020

(65) Prior Publication Data
US 2022/0248308 A1   Aug. 4, 2022

(30) Foreign Application Priority Data
May 28, 2019  (WO) ................ PCT/CN2019/088795

(51) Int. Cl.
*H04W 4/00*   (2018.01)
*H04W 8/04*   (2009.01)
*H04W 48/16*  (2009.01)

(52) U.S. Cl.
CPC ............. *H04W 48/16* (2013.01); *H04W 8/04* (2013.01)

(58) Field of Classification Search
CPC ................................ H04W 48/16; H04W 8/04
(Continued)

(56) References Cited

U.S. PATENT DOCUMENTS 8,537,784 B1   9/2013   Wurtenberger et al.
8,892,093 B1   11/2014  Wurtenberger et al.
(Continued)

FOREIGN PATENT DOCUMENTS

CN   105792318      7/2016
EP   2627128 A1    8/2013
(Continued)

OTHER PUBLICATIONS

International Search Report (PCT/ISA/210) and Written Opinion (PCT/ISA/237) mailed on Aug. 28, 2020, by the European Patent Office as the International Searching Authority for International Application No. PCT/EP2020/060872 (WO2020/239324)—[16 pages].
(Continued)

*Primary Examiner* — Temica M Beamer
(74) *Attorney, Agent, or Firm* — PEARL COHEN ZEDEK LATZER BARATZ LLP (57) ABSTRACT

Provided is a method to operate a user equipment operating in a cellular network different from the user equipment's home cellular network, the user equipment being configured to carry out, following a periodic home network scan cycle, a measurement attempt to the home cellular network, the user equipment operating in a reduced activity mode, comprising reduced measurement activity time periods, comprising the step of comparing the periodic home network scan cycle with the reduced activity mode's reduced measurement activity time period, in case the periodic home network scan cycle is shorter than the reduced measurement activity time period, amending the periodic home network scan cycle.

17 Claims, 3 Drawing Sheets

(58) Field of Classification Search
USPC .......................................................... 455/434
See application file for complete search history.

(56) References Cited

U.S. PATENT DOCUMENTS

| | | | | |
|---|---|---|---|---|
| 2012/0269163 | A1* | 10/2012 | Edara | H04W 24/00 370/329 |
| 2013/0210428 | A1 | 8/2013 | Manna et al. | |
| 2014/0073320 | A1 | 3/2014 | Dhanda et al. | |
| 2015/0223151 | A1* | 8/2015 | Lei | H04W 72/30 455/434 |
| 2016/0309399 | A1 | 10/2016 | Swaminathan et al. | |
| 2017/0094589 | A1 | 3/2017 | Bhasin et al. | |
| 2017/0289965 | A1 | 10/2017 | You et al. | |
| 2018/0242229 | A1 | 8/2018 | Ahluwalla | |
| 2020/0029271 | A1* | 1/2020 | Sood | H04B 17/318 |

FOREIGN PATENT DOCUMENTS

| | | |
|---|---|---|
| JP | H11196445 A | 7/1997 |
| JP | 2003-169013 | 6/2003 |
| KR | 20060043969 A1 | 5/2006 |
| KR | 5174364 A1 | 5/2016 |
| KR | 20160134439 | 11/2016 |
| WO | 2010001452 A1 | 1/2010 |
| WO | WO2014113329 | 7/2014 |
| WO | WO2015024213 | 2/2015 |
| WO | WO2016111684 | 7/2016 |

OTHER PUBLICATIONS

Qualcomm Incorporated: "Per RAT higher priority PLMN search timer I for UEs supporting IoT and non IoT RATs", 3GPP Draft; 23122 CR0360 (REL-15) C1-184236, 3rd Generation Partnership Project (3GPP), Mobile Competence Centre; 650, Route Des Lucioles; F-06921 Sophia-Antipolis Cedex; France vol. CT WG1, No. Sophia-Antipolis (France); Jul. 9, 2018-Jul. 13, 2018 Sep. 3, 2018 (Sep. 3, 2018).

Gemalto NV: "eDRX/relaxed monitoring HPLMN scan conflicts", 3GPP Draft; C1-194178, 3rd Generation Partnership Project (3GPP), Mobile Competence Centre; 650, Route Des Lucioles ; F-06921 Sophia-Antipolis Cedex ; France vol. CT WG1, No. Wroclaw, Poland; Aug. 26, 2019-Aug. 30, 2019 Aug. 12, 2019 (Aug. 12, 2019).

Office Action dd Nov. 29, 2022 from Japanese Patent Office for co-pending JP Application N°2021-570243 and English translation (4 pages).

C1-163079-rev-of-C1-162497-PLMN-scan-and-PSM-24301-d50, "Handling of PLMN background scan timer during PSM", 3GPP TSG-CT WG1 Meeting #98,Osaka (Japan), May 23-27, 2016.

Li Bing, et al."Modern science and technology of telecommunications" Research on a method for mobile terminal to quickly switch to home network, Published Dec. 31, 2011.

R5-130507 34.123 9.5.4.7 PLMN selection—Minimum periodic search timer "New NIMTC test case 9.5.4.7 Location updating / periodic search for HPLMN or higher priority PLMN / UE waits UE waits Minimum Periodic search timer", issued Jan. 19, 2013; 3GPP TSG-RAN WG5 Meeting #58 R5-130507, St. Julian's, Malta, Jan. 28-Feb. 1, 2013.

R5-140633 34.123 MTC USIM clarification,"Corrections to UTRA NIMTC test cases 9.4.3.7, 9.4.5.4.7, 9.4.5.5, 11.1.3.4, 12.2.1.1a, 12.2.2.3a, 12.4.3.2a" issued Feb. 2, 2014; 3GPP TSG-RAN5 Meeting #62 R5-140633 Prague, Czech, May 10-14, 2014.

3GPP TS 23.122 V14.4.0; 3rd Generation Partnership Project; Technical Specification Group Core Network and Terminals; Non-Access-Stratum (NAS) functions related to Mobile Station (MS) in idle mode, Release 14), Sep. 2017.

3GPP TS 31.121 V14.4.0; 3rd Generation Partnership Project; Technical Specification Group Core Network and Terminals; UICC-terminal interface; Universal Subscriber Identity Module (USIM) application test specification (Release 14), Apr. 2018.

Examination Report from Indian Patent Office for co-pending patent Application N°202117052113 in English (7 pages).

* cited by examiner

Fig. 3

METHOD FOR IMPROVED ROAMING OF A LIMITED-BANDWIDTH USER EQUIPMENT

CROSS-REFERENCE TO RELATED APPLICATIONS

This application is a National Phase Application of PCT International Application No. PCT/EP2020/060872, International Filing Date Apr. 17, 2020, claiming priority to PCT International Application No. PCT/CN2019/088795, International Filing Date May 28, 2019, which are hereby incorporated by reference.

FIELD OF THE INVENTION

The present invention relates to a method for operating a user equipment operating in a cellular network. The invention also pertains to a user equipment using said method.

The invention further relates to base station serving said user equipment. The invention additionally relates to a subscriber identity module connectable to the user equipment.

BACKGROUND OF THE INVENTION

In the field of wireless cellular communication it is known that a user equipment that is operating in an area which is not covered by a cellular network from the mobile operator who issues the SIM card, the user equipment is operating in roaming mode with a so-called visited cellular network.

In order to save costs for the end customer, it is defined in the standard, that the user equipment takes the necessary steps to avoid staying too long in that visited cellular network. For that the user equipment (UE) is supposed to regularly carry out a scan for the home public land mobile network (HPLMN). According to the network configuration this is happening in the range of minutes, in order to quickly notice availability of suitable cells of the HPLMN. The return to the home network is also in the interest of the home operator not having to share the related fees with the operator of the visited network. The UE scans for the HPLMN according to a timer value stored on the SIM/USIM card, according to the periodic home network scan cycle T. The first scan is done after 2 minutes and subsequent scanning approaches according to the timer values can last from 6 minutes to 8 hours for all devices which do not only support the technologies NB-IoT, Cat-M or EC-GSM IoT. Means devices which have at least e.g. GSM or plain LTE in addition populated on the platform have to comply to this rule.

However due to UEs which can move across borders a value of 6 min is chosen in most deployments and individual adaption of that static operator setting for special devices is often objected from network operators, even for UEs which are operated permanently in roaming. Especially for operating IoT devices so called V-MNOs Virtual-Network-Operators are often used, which rely on the resources of a specific PLMN in a certain region and keeping the user equipments constantly in roaming.

However for some types of user equipments, in particular those operating in the substandards NB-IoT, Cat-M etc., it is usually the case that they are powered by a battery which is designated to last a comparable long time. Due to that a power budget per time period is calculated for such user equipments. This is however endangered when the user equipment is operating in roaming mode and needs to perform HPLMN scanning unnecessary often. Especially tracking and tracing devices e.g. when installed in a container, may be stored in one area a long time hence should be operated in power saving. But when being shipped together with some goods they also may need to cross borders i.e. it is important to do regular HPLMN scanning.

Moreover in general for UEs which have a limited power budget available the standard has developed power saving features, such as eDRX or relaxed monitoring state. In both cases the power saving idle period is far larger than the typical configured HPLMN scan value of 6 minutes, means it would subsequentially be interrupted. If these power saving features now interact with the requirement for HPLMN scanning, i.e. scan for the HPLMN i.e. perform inter-frequency measurements on maybe even on various carriers every 6 minutes, then the benefits from power saving will be decreased heavily. Furthermore it is questionable whether such a behavior would make sense, i.e. if the UE has evaluated that it is momentary static and entered relaxed monitoring state, it is questionably, why would there be a need to scan every 6 minutes whether the home HPLMN is now reachable. Network layouts can change but scanning at said density is far too much giving the power saving needs of such UEs.

In addition operating in a roaming scenario is less unlikely as it seems, as often in the field of Internet of things (IoT), such user equipments are operating with a V-MNO subscription, so almost any cellular network is a visited network.

For such user equipments the power consumption is in particular increased due to the fact, that they are using modes with reduced power consumption, which lead to a tremendous reduction of signalling and/or measurement activity compared to a common user equipment, like a smart phone that gets charged each day.

Setting the HPLMN timer to an extremely high value could avoid said interaction but would have drawbacks for all user equipment being used as tracking and tracing devices which may lead to unavailability. Consequently operators do not want to change or update this values based on device type dynamically, and so refuse to change it.

With the deactivation or limitation of said modes with reduced power consumption due to the roaming scenario the power budget will be exhausted soon.

It is therefore the goal of present invention to overcome the mentioned disadvantages and to propose a solution for operating limited-bandwidth user equipments in roaming scenarios.

Further alternative and advantageous solutions would, accordingly, be desirable in the art.

SUMMARY OF THE INVENTION

In a first aspect, the invention is embodied as a method to operate a user equipment. In a second aspect, the invention is embodied as a user equipment. In a third aspect, the invention embodied as a base station. In a fourth aspect, the invention is embodied as a subscriber identity module.

It is therefore proposed according to the first aspect of the invention it is proposed a method to operate a user equipment operating in a cellular network different from the user equipment's home cellular network, the user equipment being configured to carry out, following a periodic home network scan cycle, a measurement attempt to the home cellular network, the user equipment operating in a reduced activity mode, comprising reduced measurement activity time periods, comprising the step of comparing the periodic home network scan cycle with the reduced activity mode's reduced measurement activity time period, in case the periodic home network scan cycle is shorter than the reduced measurement activity time period, amending the periodic home network scan cycle.

The inventive method is dedicated for a user equipment which is configured for operating in a cellular network.

The user equipment is generally any kind of device comprising at least transmitting and receiving circuitry, processing circuitry and an antenna for accessing the wireless air interface with the serving base station.

The serving base station is one of a plurality of base stations belonging to the cellular network. It is the base station the user equipment is camping on.

The base station is the entry point of the cellular network to the air interface. Depending upon the supported technology, like 2G (GSM, GPRS, EDGE), 3G (UMTS, HSPA), 4G (LTE, LTE-Catx, LTE-M) the base station is implemented in particular as a base station (BS), nodeB, eNodeB.

The user equipment is further configured to operate in a reduced activity mode. This is in particular a mode which allows the user equipment to operate with the cellular network in a way which comprised to require less measurement activity by the user equipment towards at least the serving base station. This reduced activity mode is further dedicated to reduce power consumption of the user equipment in order to operate in line with power consumption targets for that user equipment, that may comprise to be operable with one battery for a couple of years.

In particular stationary user equipments, in particular machine-type communication (MTC) or Internet of Things (IoT) devices are configured to operate in such a reduced activity mode.

The user equipment further comprises a subscriber identity unit. This is a secure unit, in case of a SIM or UICC typically removable, in case of an eUICC typically soldered to the user equipment, which holds in its secured memory all necessary credentials for authenticating at the cellular network upon registration.

Further the user equipment is expected to carry out measurement attempts for home cellular network components, following a periodic home network scan cycle. Such requirement in particular follows cellular communication standards for user equipments that are roaming in a visited cellular network. In order to return as soon as possible to its home cellular network—and to reduce costs for network usage—the user equipment is expected to scan for home network cells following the periodic home networks scan cycle.

As following this home network scan cycle contradicts the reduced activity mode, it requires a mode of operation that balances both requirements. Here comes the inventive method into play.

According to this method it proposes for a roaming user equipment to ascertain the periodic home network scan cycle. Then it compares this periodic home network scan cycle with the reduced activity mode's reduce measurement activity time period.

According to a preferred embodiment it is proposed that the reduced activity mode comprises an increased enhanced discontinuous reception mode, and the step of amending the periodic home network scan cycle considers the reduced measurement activity time period, wherein the reduced measurement activity time period complements to the increased discontinuous reception cycle.

In enhanced discontinuous reception mode (eDRX) a UE just needs to scan for its neighbor cells once per eDRX cycle and receives the paging accordingly. eDRX is a negotiated extended sleep duration during which UE performs minimum activity and only performs once in said eDRX cycle measurements related to idle mobility and eDRX can last up to ~45 minutes for Cat-M and up to 3 hours for NB-IoT.

If the user equipment is not paged and has conducted its activities and also no data to send, it re-enters the eDRX sleep cycle. I.e. the eDRX cycle is carried out consecutive very often. Means most time the user equipment is in deep sleep during said eDRX cycle just with the interruption of one neighbor cell search and scanning for paging. If no paging is received it stays in that reduced power mode. eDRX has an enormous power saving potential given that neighbor cell measurements are carried out once per DRX cycle and a normal DRX cycle lasts up to 10.24 seconds—typical DRX cycles are used in the order of 2,56 or 1,28 seconds—whilst eDRX lasts up to 45 min in Cat-M and up to 3 hours in NB-IoT. This power saving is achieved at the cost of being reachable only once for incoming calls during an eDRX period which is acceptable for those applications.

According to another preferred embodiment it is proposed that the reduced activity mode comprises a relaxed monitoring mode, and the step of amending the periodic home network scan cycle considers the reduced measurement activity time period, wherein the reduced measurement activity time period complements to neighbor cell measurement cycle.

In case of relaxed monitoring the UE has evaluated the serving cell to be constantly (for a certain time), within a reception window. A user equipment entering relaxed monitoring has evaluated that it receives the serving cell in a certain range concerning received power level. As long as the serving cell stays in said range the UE may stop all other intra- and inter-frequency cell measurements for mobility up to a duration of 24 hours and only measure serving cell regularly.

As a consequence the UE derives that it is momentary static and only performs intra- and inter-frequency neighbor cell measurements once per 24 hours, as long as the serving cell stays within said reception quality window. Even the maximum configurable value of 8 hours for the HPLMN scan would cause unnecessary interruptions, when carrying out HPLMN Scans according to the configuration.

As a result of the comparison of the periodic home network scan cycle and the reduced activity mode's reduced measurement activity time period it is figured out, if the periodic home network scan cycle lasts longer than the reduce measurement activity time period. In particular this lasting longer comprises a predetermined threshold of exceeding the measurement activity time period, e.g. by x %.

If this is the case, then the periodic home network scan cycle is amended considering the reduce measurement activity time period.

Preferably the periodic home network scan cycle takes the value of the reduced measurement activity time period. Alternatively the periodic home network scan cycle is increased in order to roughly match the reduced measurement activity time period. This also makes sense, as the user equipment has evaluated that it is not moving and stays within same cell, hence probability to find there the HPLMN in one of the subsequent attempts after a first scanning attempt is extremely low.

According to another preferred embodiment it is proposed that the user equipment camping on a base station of said cellular network, further comprising the step of receiving signals from said base station comprising an indication of amended periodic home network scan cycle, wherein the step of amending the periodic home network scan cycle considers said received indication.

According to this embodiment it is proposed that the periodic home network scan cycle is amended taking into account an indication received from a base station, in particular the serving base station. This is preferably an alternative way of amending the periodic home network scan cycle considering the reduced measurement activity time period.

This embodiment might comprise informing the base station about the reduced measurement activity time period, respectively that the reduced measurement activity time period exceeds the periodic home network scan cycle.

Preferably the amendment is carried out after contacting the home cellular network by the visited cellular network.

In a further preferred embodiment it is propose that the signal received from the base station is received in response to amending the periodic home network scan cycle considering the reduced measurement activity time period.

This embodiment has the task to adapt the periodic home network scan cycle according to the cellular network's resp. the base stations preference as well, but in this time in response to the amendment on the user equipment side.

This embodiment in particular comprises that the user equipment informs the base station about the amended periodic home network scan cycle.

This embodiment gives the base station means to overrule decisions by the user equipment with regards to the amended periodic home network scan cycle.

At least this will most probably lead to an increase of the periodic home network scan cycle in order to consider the user equipment's power consumption requirements better than before. However, in case the amended periodic home network scan cycle seems too long for the cellular network, this embodiment advantageously provides means to mitigate this situation.

With the inventive method it is achieved that the power consumption is massively reduced as originally envisaged for such an IoT device, though operating in a visited cellular network.

This is in particular advantageous in conjunction with another preferred embodiment wherein the user equipment is at least one of:
  operating stationary,
  operating in a limited-bandwidth mode.

In particular for the first option an increase of the periodic home network scan cycle has no or at least no remarkable harm. If the user equipment is operating stationary, that means it is not moving or at least has low mobility, e.g. due to being attached to a wall (like a metering device) or only operated in a defined radius (like a POS device), then it is not to expect that after a period of 24 h the situation remarkably changes if a home cellular network base station is in sight or not.

Additionally or alternatively it is proposed that the user equipment is operating in a limited-bandwidth mode. This in particular relates to substandards of 4G/5G etc. like NB-IoT, Cat-M or the like.

Such limited-bandwidth modes are designed to reduce signalling of the user equipment, in particular for those user equipments that are not capable of operating in other modes with higher bandwidth requirements.

Such limited-bandwidth capable user equipments are in particular expected to operate in reduced activity mode, hence the inventive method is perfectly suited for such user equipments.

According to another preferred embodiment it is proposed that the user equipment further comprising a subscriber identity card, the method comprising at least one memory field for storing at least two values for the periodic home network scan cycle, wherein the method comprises the step of ascertaining the value of said at least two values for the periodic home network scan cycle that is designated for a user equipment operating in reduced activity mode.

This embodiment relates to the comprised subscriber identity card, in particular a SIM card, an UICC, USIM or eUICC.

Such subscriber identity card comprises a memory unit for storing values, including at least one memory field which is configured to store values for periodic home network scan cycle.

Said subscriber identity card is supposed to store at least two values for the periodic home network scan cycle. Preferably one value is dedicated for regular user equipments, and one for those operating in reduced activity mode or a related mode. Such related mode may be a stationary operation, operation in a certain bandwidth-reduced technology or in a mode for reduced power consumption, like eDRX or relaxed monitoring.

According to this embodiment the user equipment is supposed to receive from the subscriber identity card the value about the periodic home network scan cycle for regular operation, and for the case that the user equipment is operating in reduced activity mode the value for operating in reduced activity mode.

Hence, when the user equipment is operating in reduced activity mode and figures out that the reduced measurement activity time period is larger than the regular periodic home network scan cycle, it is proposed that the step of amending the periodic home network scan cycle is considering the reduced measurement activity time period, whereby the periodic home network scan cycle is set to the second value stored on the subscriber identity card, which is designated for reduced activity mode.

This embodiment relieves the user equipment from determining or negotiating with the base station what is the appropriate value for the periodic home network scan cycle.

Preferably the method comprises that the user equipment figures out that it is operating in reduced activity mode and—preferably after figuring out that the periodic home network scan cycle is way shorter than the reduced measurement activity time period—amends the periodic home network scan cycle to the value received from the subscriber identity card.

According to another advantageous embodiment it is suggested a method further comprising the step of evaluating if the user equipment is operating stationary, where the step of amending periodic home network scan cycle is carried out only in case the evaluation results indicates a stationary operation. With this embodiment it is coped with the situation that in future there may also be user equipments capable of operating in normal mode but also during standby-times, i.e. a car being parked, which favors to operate in a mode with reduced power consumption. Depending on the operation mode of such user equipment the HPLMN scanning density and periodicity is preferably adapted.

I.e. a car not being in its HPLMN will scan for its HPLMN according to the periodic home network scan cycle, which is in particular configured in the SIM/USIM card, when driving around. However, when being parked and operated in a reduced activity mode, the periodic home network scan cycle is according to this embodiment adapted to a cycles considering the currently applied reduced activity mode.

For devices which only consist of NB-IoT, Cat-M1 or EC-GSM IoT the first scan is done after 2 hours and subsequent scanning approaches according to the timer values can last from 2 hours to 240 hours where the steps have a granularity of 2 hours up to 84 hours and every 4 hours afterwards (refer to TS23.122 Rel.14.4.0 and TS31.122 Rel.14.4.0)

The problem outlined and resolved hereafter exists for both device types, means for plain NB-IoT, Cat-M, EC-GSM IoT devices as well as or for user equipments which support also any other technology i.e. LTE or GSM besides NB-IoT, Cat-M or EC-GSM IoT. As the technologies NB-IoT and Cat-M are not rolled out in every country and network these user equipments often have a backup technology of type LTE or GSM to avoid being out-of-service if an area is reached where these technologies or respectively the technology is not deployed. Hence the shorter scan cycles apply for these user equipments regardless which is the current active technology. Means a HPLMN scan needs to be performed every 6 minutes to 8 hours, so it is very likely that the HPLMN scan timer is larger than the eDRX cycle and it even can't be configured as long as the 24 hours being used for relaxed monitoring. This means for such user equipments with fallback technology the problem exists accordingly in its severe form. As the periodic scan times are in most cases smaller as the eDRX cycles configured and for relaxed monitoring also the smallest value would be below the maximum configurable value.

For plain NB-IoT devices periodic home network scan cycles below eDRX cycle duration can be configured and this is also true for values for Cat-M1 and NB-IoT being below relaxed monitoring scan timer being 24 hours.

Hence for such user equipment with bandwidth reduced technology like NB-IoT or Cat-M with fallback technology of LTE or GSM the proposed solution is also applicable. However, as explained above the problem and solution is not limited to said device type, it is rather used as an example.

Especially due to devices crossing borders and have similar behavior with plain LTE devices same values are often used for them.

Preferably it is further advantageous to figure out if the user equipment is operating in the fallback technology although generally able to operate in the bandwidth reduced technology, and hence switch to the bandwidth reduced technology and amend the periodic home network scan cycle, in particular considering the reduced measurement activity time period envisaged for the bandwidth reduced technology.

With that it is possible to apply the inventive method to more user equipments, in particular those that have a limited power budget, in a roaming scenario.

According to the second aspect of the invention it is proposed a user equipment configured to operate in a cellular network different from the user equipment's home cellular network, the user equipment being further configured to carry out, following a periodic home network scan cycle (T), a measurement attempt to the home cellular network, and to operate in a reduced activity mode, comprising reduced measurement activity time periods, wherein the user equipment is further configured to compare the periodic home network scan cycle with the reduced activity mode's reduced measurement activity time period, in case the periodic home network scan cycle is shorter than the reduced measurement activity time period, amend the periodic home network scan cycle considering the reduced measurement activity time period.

This aspect of the invention relates to a user equipment for operating with a base station of a cellular network. For that it comprises transmission and reception circuitry that in particular in conjunction with an antenna allows communicating over the air interface with a base station.

Further it comprises processing circuitry configured for executing software controlling at least the transmission and reception circuitry.

Preferably the user equipment further comprises a control unit, which is preferably the application that is designated to collect e.g. sensor data that are supposed to be transmitted via the transmitting and receiving circuitry to a remote server communicatively coupled with the user equipment by means of the cellular network.

The user equipment therefore preferably comprises a control unit and a communication unit, the latter also called modem or communication module, wherein the communication unit comprises transmitting and receiving circuitry, and preferably process circuitry, while the control unit has preferably additional processing circuitry that is configured to control the communication unit through a call interface.

This aspect of the invention shares the advantages of the first aspect of the invention.

According to the third aspect of the invention it is proposed a base station of a cellular network, configured to serve at least one user equipment, wherein the base station is configured to transmit an indication to the user equipment indicating an amended periodic home network scan cycle.

This aspect of the invention relates to a base station of a cellular network, that comprises preferably a plurality of base stations.

This base station has transmitting and receiving circuitry for conducting wireless communication with the user equipment according to the second aspect of the invention. It has further communication circuitry for communicating with other components of the cellular network, like the MME, HSS, etc.

The base station of this aspect of the invention is additionally configured to communicate with at least one camping user equipment by sending an indication for an amended periodic home network scan cycle.

With this aspect the cellular network through the base station resp. the base station as such has the possibility to influence the setting of the periodic home network scan cycle, in particular when the user equipment is operating in a reduced activity mode. This is an information that the base station preferably gets aware of.

Consequently in response the base station provides this indication for the user equipment to consider for amending the periodic home network scan cycle.

This is advantageous as it gives the base station resp. the cellular network means to adopt that value, in particular when the user equipment is inclined to make such decisions alone without considering cellular network requirements.

There are at least two alternatives how to provide the indication to the user equipment.

According to an advantageous embodiment of this aspect of the invention it is proposed that said indication is transmitted in a broadcast of system information dedicated for limited-bandwidth user equipments.

This broadcasting allows the user equipment to gather the required information without indicating to the base station the intent to amend the periodic home network scan cycle.

Preferably the broadcasted information is part of the SIBs resp. M-SIBs.

Alternatively or additionally this signalling is carried out through on-demand SIBs, that means SIBs which are regularly not broadcasted are in case of a demand message from the user equipment activated.

According to another embodiment it is proposed that the base station is further configured to determine that a user equipment camping on the base station amended the periodic home network scan cycle, and in response to transmit said indication to said user equipment.

In this alternative solution the user equipment informs the base station about the amended periodic home network scan cycle. In response the base station sends, preferably in dedicated signalling, the indication of the periodic home network scan cycle for a user equipment in reduced activity mode.

According to the fourth aspect of the invention it is proposed a Subscriber identity module configured to be communicatively coupled to a user equipment, and comprising a memory unit, configured to store at least two values for the periodic home network scan cycle, wherein one of said values for the periodic home network scan cycle is designated for a user equipment operating in reduced activity mode.

This aspect of the invention relates to a subscriber identity module communicatively coupled to a user equipment according to the second aspect of the invention.

It comprises a memory unit for permanently storing information, in particular configuration parameter and authentication credentials.

It further comprises a communication interface for the connected user equipment for requesting information, in particular those stored in the memory unit. Further it provides means for transparently—by means of the user equipments communication unit—communicate with cellular network components resp. remote servers accessible through the cellular network.

This provides an access channel to said server.

The subscriber identity module according to this aspect of the invention stores at least two values for configuring the periodic home network scan cycle of the user equipment.

By means of the communication interface the user equipment may request such values. The first value is then considered as periodic home network scan cycle when not operating in a reduced activity mode.

The second value is considered as periodic home network scan cycle when operating in a reduced activity mode.

It is preferably up to the user equipment to separately ask for the respective value, in particular in conjunction with activating resp. deactivating said reduced activity mode. This option has the advantage to be reactive of changes of such value in the subscriber identity module.

Preferably such values are configured by means of the transparent access channel to the remote server. With that the remote server initiatively or on request may via OTA remote configuration update at least such values for the periodic home network scan cycle of the user equipment.

Consequently, when the user equipment request such values from the subscriber identity module in conjunction with the activation of the reduced activity mode, then it reliably receives the latest updated value.

Preferably the user equipment requests such value from the subscriber identity module with providing the value for the periodic home network scan cycle which was derived from the respective cycle of the reduced activity mode.

The subscriber identity module is preferably configured to provide this value to the remote server e.g. as part of an update request. Hence the remote server or the cellular network where the remote server is associated with may via this way react on amendments to the periodic home network scan cycle by the user equipment.

As it is shown this invention advantageously solves the depicted problem and provides methods and apparatus for amending the periodic home network scan cycle accordingly in order to balance requirements of the user equipment and the cellular network.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

Figure 1:
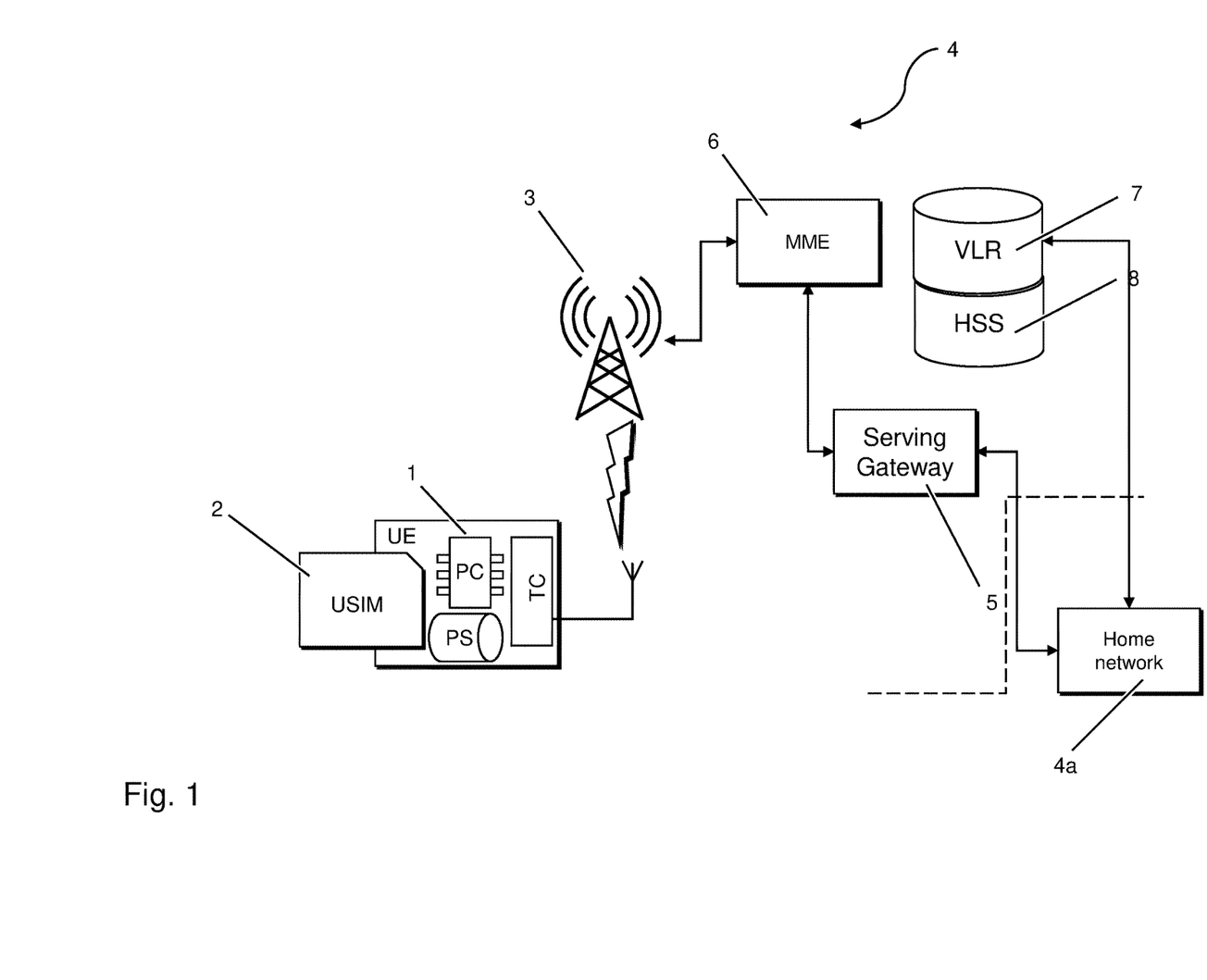
FIG. 1 represents a user equipment of the type to which the present invention is applied as an embodiment in cooperation a cellular network.

FIG. 1 schematically shows a user equipment 1 of the type to which the present invention is applied as an embodiment. The user equipment comprises processing circuitry PC for controlling at least transceiver circuitry TC, that allows exchange of radio signals with a base station 3 of a cellular network. Preferably it is able to operate with a base station implementing 3G, 4G, or beyond cellular standard. Preferably it supports a substandard that is designed for bandwidth-reduced user equipments like NB-IoT or Cat-M. The user equipment 1 in this embodiment forms or is part of an IoT device operated with a battery as power supply PS, and has assigned a power budget for a given time period, which shall allow the user equipment to operate for a time period e.g. in the scale of years.

Additionally the user equipment 1 of this embodiment is connected to a subscriber identification module 2, which is capable to store at least authentication credentials for operating in the cellular network. Further the subscriber identification module 2 is capable of storing one or more values of applicable periodic home network scan cycles.

In this shown situation of the embodiment the user equipment 1 is camping on base station 3, which is one of a plurality of base stations of cellular network 4. The base station 3 is communicatively coupled to a MME 6 of the cellular network 4 and has access to the databases VLR 7 and HSS 8.

In this embodiment the user equipment 1 holds a subscriber identification module 2 issued by a network operator different from that operating the shown cellular network 4. This is the second network operator running a second cellular network, hereinafter the home network 4*a*. However, both network operators have roaming agreements in place, which allow user equipments 1 equipped with a USIM 2 of the second network operator to operate in the cellular network 4 of the first network operator.

The cellular network 4 normally checks for subscribers of the cellular network in the home subscriber server (HSS) 8 for the credentials and additional data from a user equipment 1 registering in the cellular network. For roaming user equipments 1 however it is looked in the visitor location register (VLR) 7. Should the subscriber data not be available there yet, the cellular network 4 requests through the serving gateway 5 at the home network 4a if the subscriber is eligible for operating in the cellular network 4 and to what extent. Those data are then stored in the VLR 7 for future accesses.

Through the serving gateway 5 further access to the internet is established for IP based traffic between a user equipment and a remote server (not shown).

Figure 2:
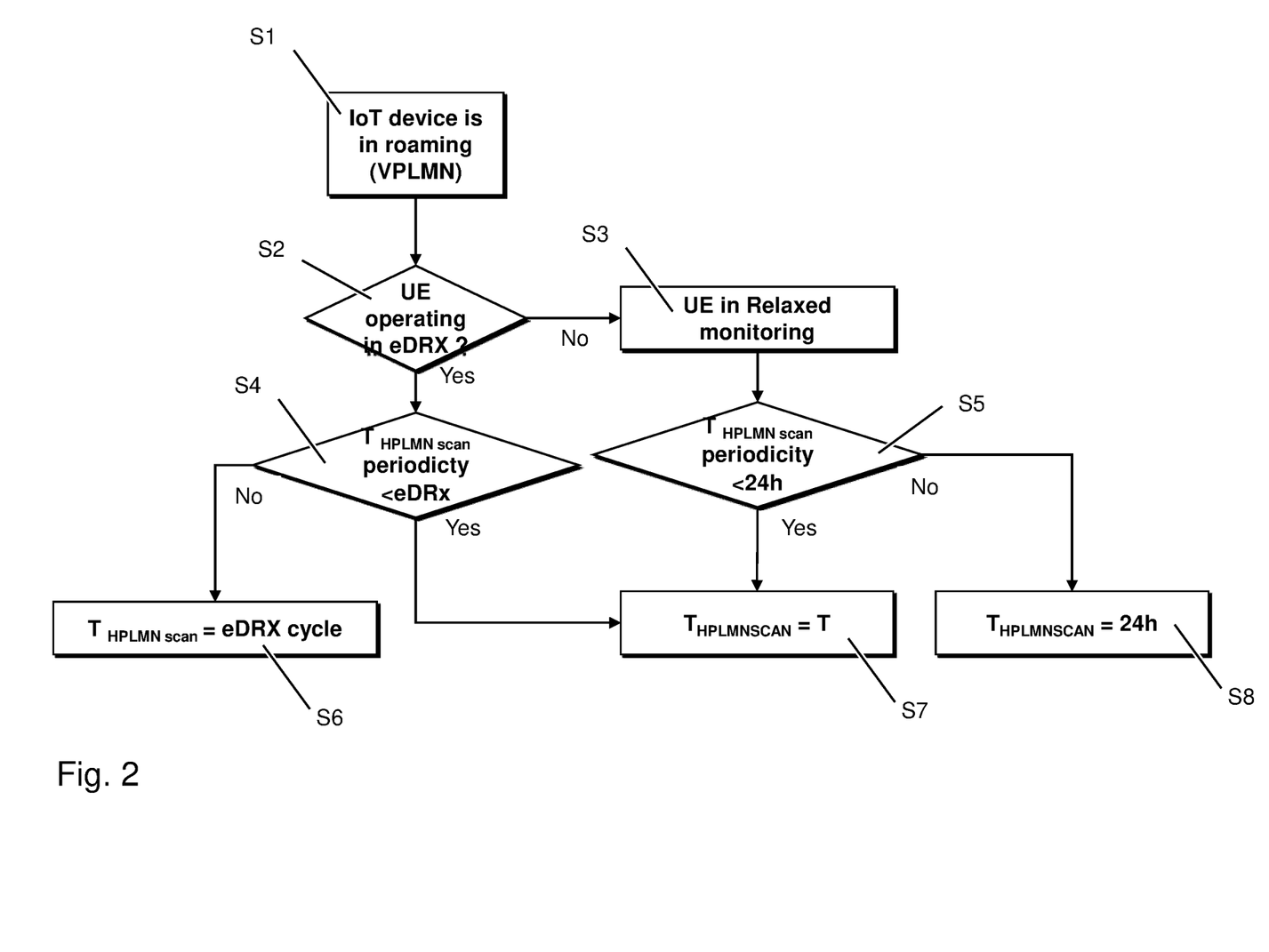
FIG. 2 shows a flow chart representing an embodiment of the inventive method.

FIG. 2 shows in a flow chart an exemplifying embodiment of the inventive method for a user equipment 1 as shown before.

The user equipment is as shown in step S1 an IoT device and operating with a cellular network 4 as visitor, means it is roaming, as depicted in the previous figure.

As the user equipment is a IoT device it prefers to save power. For that it has checked with its USIM, if eDRX preference is present and a long eDRX cycle is established. This is typically done at registration.

In decision step S2 it is then checked if eDRX is (still) active.

If this is the case the method flow branches to step S4. Otherwise the method flow branches to step S3.

Here it is checked if the user equipment is operating in relaxed monitoring. If so then it is branched to decision step S5 where it is checked if the HPLMN-Scan periodicity T, which complements in this exemplifying embodiment the periodic home network scan cycle, is lower than 24 h, which is in this embodiment the duration for relaxed monitoring.

If this is the case, then the HPLMN Scan periodicity is set to T=24 h in step S8, in order to align with the relaxed monitoring, and the operation continues. Otherwise the HPLMN Scan periodicity remains unchanged, as indicted in step S7.

In step S4 it is branched when the user equipment is operating in eDRX. Consequently in step S4 it is checked if the HPLMN scan periodicity T is lower than the eDRX cycle.

If this is the case, than in step S6 the HPLMN scan periodicity T is set to the eDRX cycle, otherwise it is again branched to step S7 and the HPLMN scan periodicity T remains unchanged.

Preferably this method flow needs to be established once after registration of a user equipment. Updates are in particular possible when one of the parameters, eDRX cycle, default HPLMN scan periodicity or relaxed monitoring cycle change.

A regular check after a given time period may also be useful, as well as when changing to another base station, or other outside triggers.

Additionally in step S6 and/or S8 other values might be chosen for amended HPLMN scan periodicity, when the user equipment checks values for roaming devices operating in at least one reduced activity mode like eDRX or relaxed monitoring at the attached USIM.

Figure 3:
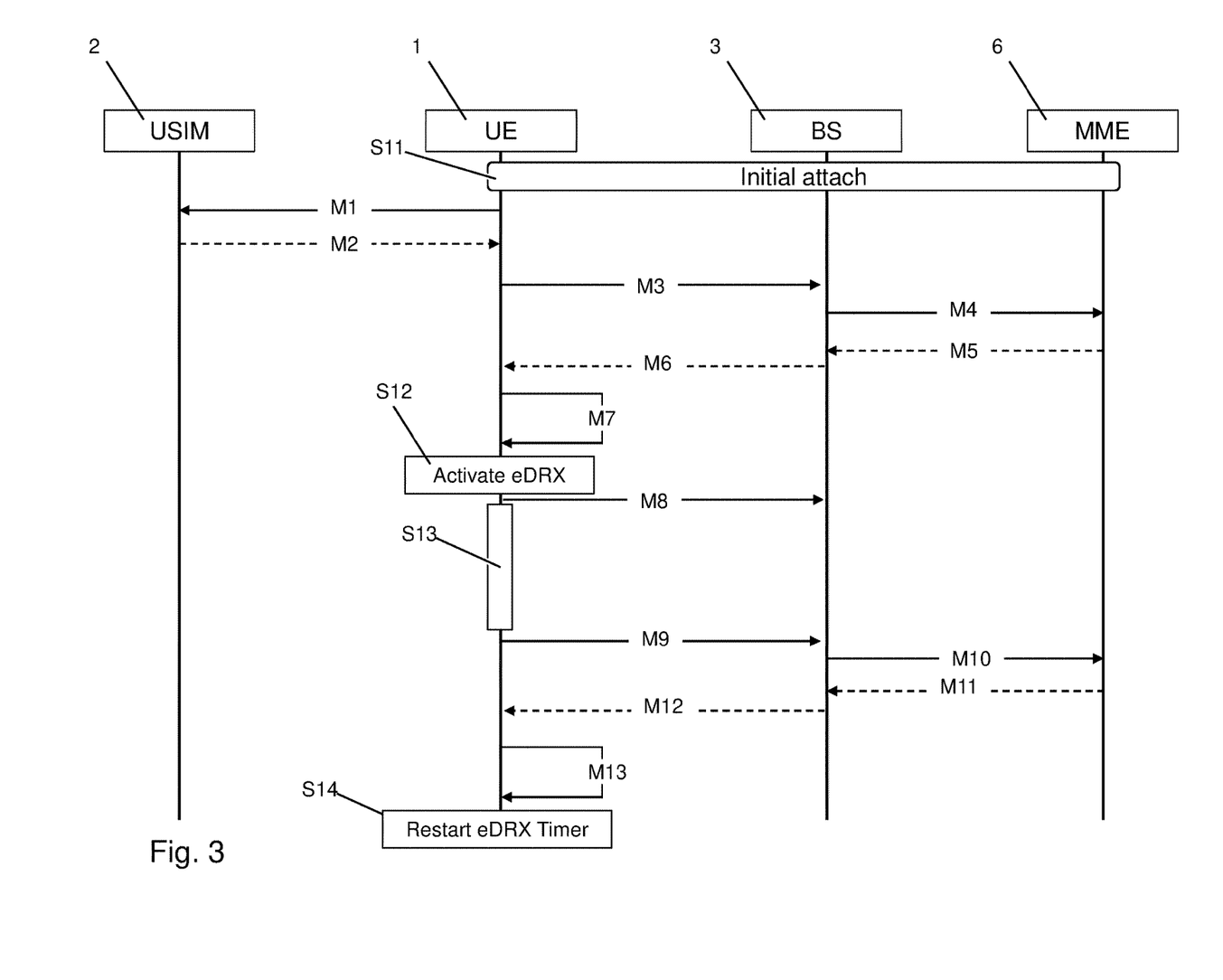
FIG. 3 displays a sequence diagram showing another embodiment of the inventive method.

In the sequence diagram shown in FIG. 3 it is now shown the impact of the inventive method.

This sequence diagram shows message flow between the subscriber identification module 2, the user equipment 1, a base station 3 of the visited cellular network and the respective MME 6 of the cellular network.

The sequence diagram assumes that the initial attach of the user equipment has concluded in step S11.

Then the user equipment checks with message M1 to the USIM 2, if a eDRX preference is preset. This is in particular the case for IoT devices and the respective subscription. Typically IoT subscriptions are less expensive than regular smartphone subscriptions, consequently the USIM 2 holds data that support less intrusive usage of the cellular network.

With message M2 the user equipment is informed that in this case eDRX preference is available. Typically the user equipment learns e.g. through broadcast channels of the base station 3, if the base station itself is capable to support eDRX as well. In this exemplifying embodiment it is assumed that this is the case.

Then a regular set of cyclic operations is carried out according to the normal procedure. This in this case first a tracking area update TAU, which is started with message M3 to the base station. The base station forwards with message M4 to the MME, if the tracking area is still valid, and gets with message M5 a response message which indicates acceptance. This is forwarded with message M6 to the user equipment.

With message M3-M6 hence a normal, successful TAU request is carried out. The TAU request frequency is governed by the DRX cycle.

Then a Home PLMN scan is carried out with message M7. This is an activity to check if a base station of the home PLMN is in proximity and sufficiently strong to reselect to it.

The frequency of doing this Home PLMN scan is preconfigured on the subscriber identity card (USIM) and typically in the range of 6 minutes, and the first scan is done after 2 minutes. The value is preconfigured and provided by the operator.

In this exemplifying embodiment no base station from the home cellular network 4a is found.

Following the eDRX preference request in M1/M2 then the user equipment activates in step S12 the eDRX cycle, that means the DRX is enhanced by a remarkable time. Preferably this activation is additionally notified to the base station with message M8.

With that the TAU request appears way more rarely than with normal DRX. Without TAU requests and data exchanges, which are triggered by the user equipment 1, the user equipment would normally not have to do anything, and can therefore go in a mode with remarkably reduced activity, like a sleep mode. However, in a roaming scenario still the HPLMN Scans would need to be carried out.

Following the inventive method the periodicity T of HPLMN Scans is however increased, in particular to the amount of the eDRX cycle, in case eDRX is activated. Alternatively the value is taken from the USIM, e.g. with message M2.

Therefore in step S13 the sleep mode is activated, during that neither a TAU request nor a HPLMN Scan is carried out.

After terminating the sleep mode when the eDRX cycle has expired, then the TAU request with messages M9-M12 is carried out.

Further with message M13 a home PLMN scan is carried out again.

Afterwards in step S14 the eDRX timer is restarted and the operating flow beginning with S3 starts again.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method of operating a user equipment operating in a cellular network different from the user equipment's home cellular network, the user equipment being configured to carry out, following a periodic home network scan cycle, a measurement attempt to the home cellular network, the user equipment operating in a reduced activity mode, comprising reduced measurement activity time periods, the method comprising the steps of comparing the periodic home network scan cycle with the reduced activity mode's reduced measurement activity time period, and, in case the periodic home network scan cycle is shorter than the reduced measurement activity time period, amending the periodic home network scan cycle.

2. The method according to claim 1, wherein the reduced activity mode comprises an increased enhanced discontinuous reception mode, and the step of amending the periodic home network scan cycle considers the reduced measurement activity time period, wherein the reduced measurement activity time period complements to the increased discontinuous reception cycle.

3. The method according to claim 1, wherein the reduced activity mode comprises a relaxed monitoring mode, and the step of amending the periodic home network scan cycle considers the reduced measurement activity time period wherein the reduced measurement activity time period complements to neighbor cell measurement cycle.

4. The method according to claim 1, wherein the user equipment is at least one of:
operated stationary,
operated in a limited-bandwidth mode.

5. The method according to claim 1, wherein the user equipment is camping on a base station of said cellular network,
further comprising the step of receiving signals from said base station comprising an indication of an amended periodic home network scan cycle,
wherein the step of amending the periodic home network scan cycle considers said received indication.

6. The method according to claim 5, wherein the signal received from the base station is received in response to amending the periodic home network scan cycle considering the reduced measurement activity time period.

7. The method according to claim 6,
the user equipment further comprising a subscriber identity card, the method comprising at least one memory field for storing at least two values for the periodic home network scan cycle, wherein the method comprises the step of ascertaining the value of said at least two values for the periodic home network scan cycle that is designated for a user equipment (1) operating in reduced activity mode.

8. The method according to claim 4,
further comprising the step of evaluating if the user equipment (1) is operating stationary,
where the step of amending periodic home network scan cycle is carried out only in case the evaluation results indicates a stationary operation.

9. A user equipment configured to operate in a cellular network different from the user equipment's home cellular network, the user equipment being further configured to carry out, following a periodic home network scan cycle, a measurement attempt to the home cellular network, and to operate in a reduced activity mode, comprising reduced measurement activity time periods,
wherein the user equipment is further configured to compare the periodic home network scan cycle with the reduced activity mode's reduced measurement activity time period, and
in case the periodic home network scan cycle is shorter than the reduced measurement activity time period, amend the periodic home network scan cycle.

10. The user equipment according to claim 9, wherein for amending the periodic home network scan cycle the user equipment is configured to consider the reduced measurement activity time period, wherein the reduced activity mode comprises at least one of:
an increased enhanced discontinuous reception mode, wherein the reduced measurement activity time period complements to the increased discontinuous reception cycle, and
a relaxed monitoring mode, wherein the reduced measurement activity time period complements to neighbor cell measurement cycle.

11. The user equipment according to claim 10, the user equipment camping on a base station of said cellular network, and further being configured to receive signals from said base station comprising an indication of an amended periodic home network scan cycle, wherein for amending the periodic home network scan cycle the user equipment is configured to consider said received indication.

12. The user equipment according to claim 11, wherein the user equipment is configured to evaluate if the user equipment is operating stationary, and to amend the periodic home network scan cycle the user equipment only in case the evaluation results indicates a stationary operation.

13. The user equipment according to claim 12, wherein the user equipment further comprising a subscriber identity card, comprising at least one memory field for storing at least two values for the periodic home network scan cycle, wherein the user equipment is further configured to ascertaining from the subscriber identity card the value of said at least two values for the periodic home network scan cycle that is designated for a user equipment operating in reduced activity mode.

14. A system comprising the user equipment according to claim 11 and further comprising a base station, wherein the base station is configured to transmit an indication to the user equipment indicating the amended periodic home network scan cycle.

15. The system according to claim 14, wherein said indication is transmitted in a broadcast of system information dedicated for limited-bandwidth user equipments.

16. The system according to claim 15, wherein the base station is further configured to determine that a user equipment camping on the base station amended the periodic home network scan cycle, and in response to transmit said indication to said user equipment.

17. The user equipment of claim 12, further comprising a Subscriber identity module configured to be communicatively coupled to the user equipment, and comprising a memory unit, configured to store at least two values for the periodic home network scan cycle, wherein one of said values for the periodic home network scan cycle is designated for a user equipment operating in reduced activity mode.

* * * * *